United States Patent
Greenfield et al.

(10) Patent No.: US 9,582,430 B2
(45) Date of Patent: Feb. 28, 2017

(54) ASYMMETRIC SET COMBINED CACHE

(71) Applicant: Intel Corporation, Santa Clara, CA (US)

(72) Inventors: Zvika Greenfield, Kfar Sava (IL); Nadav Bonen, Ofer (IL); Israel Diamand, Aderet (IL)

(73) Assignee: Intel Corporation, Santa Clara, CA (US)

( * ) Notice: Subject to any disclaimer, the term of this patent is extended or adjusted under 35 U.S.C. 154(b) by 143 days.

(21) Appl. No.: 14/671,927

(22) Filed: Mar. 27, 2015

(65) Prior Publication Data

US 2016/0283392 A1  Sep. 29, 2016

(51) Int. Cl.
  *G06F 13/00* (2006.01)
  *G06F 12/08* (2016.01)

(52) U.S. Cl.
  CPC ...... *G06F 12/0895* (2013.01); *G06F 12/0808* (2013.01); *G06F 12/0842* (2013.01); *G06F 2212/1016* (2013.01); *G06F 2212/62* (2013.01)

(58) Field of Classification Search
  CPC .......... G06F 13/00; G06F 13/28; G06F 12/00; G06F 12/28
  See application file for complete search history.

(56) References Cited

U.S. PATENT DOCUMENTS

| | | |
|---|---|---|
| 5,581,725 A | 12/1996 | Nakayama |
| 7,606,994 B1 | 10/2009 | Cypher |
| 2004/0260881 A1 | 12/2004 | Chauvel et al. |
| 2009/0204764 A1 | 8/2009 | Larson et al. |

FOREIGN PATENT DOCUMENTS

WO    WO-03102781    11/2003

OTHER PUBLICATIONS

International Search Report and Written Opinion in PCT Application No. US2016/017340 mailed on May 24, 2016, 11 pages.

*Primary Examiner* — Charles Rones
*Assistant Examiner* — Han Doan
(74) *Attorney, Agent, or Firm* — Blakely, Sokoloff, Taylor & Zafman LLP

(57) ABSTRACT

Embodiments are generally directed to an asymmetric set combined cache including a direct-mapped cache portion and a multi-way cache portion. A processor may include one or more processing cores for processing of data, and a cache memory to cache data from a main memory for the one or more processing cores, the cache memory including a first cache portion, the first cache portion including a direct-mapped cache, and a second cache portion, the second cache portion including a multi-way cache. The cache memory includes asymmetric sets in the first cache portion and the second cache portion, the first cache portion being larger than the second cache portion. A coordinated replacement policy for the cache memory provides for replacement of data in the first cache portion and the second cache portion.

24 Claims, 8 Drawing Sheets

MAIN MEMORY
130

ASYMMETRIC SET COMBINED CACHE

TECHNICAL FIELD

Embodiments described herein generally relate to the field of electronic devices and, more particularly, to an asymmetric set combined cache.

BACKGROUND

In computer memory, a cache memory (also referred to simply as a cache) may be implemented in various ways, including direct-mapped caches, in which memory locations are mapped to a single location, and multi-way caches, in which memory locations are mapped to a certain set of locations.

A direct-mapped cache has certain advantages resulting from the simplicity of the cache implementation. In operation, in order to determine whether a memory element is present only a single cache location needs to be searched. However, a direct-mapped cache has a disadvantage of low associativity and as result pinning (locking addresses in cache) is also problematic.

In contrast, a multi-way cache can address associativity and pinning issues. However, the multi-way cache is more complex, and requires more searching in order to determine whether an element is present in the cache because each cache location in the set must be searched.

Further, use of multiple caches adds significant complexity to design and operation of components.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
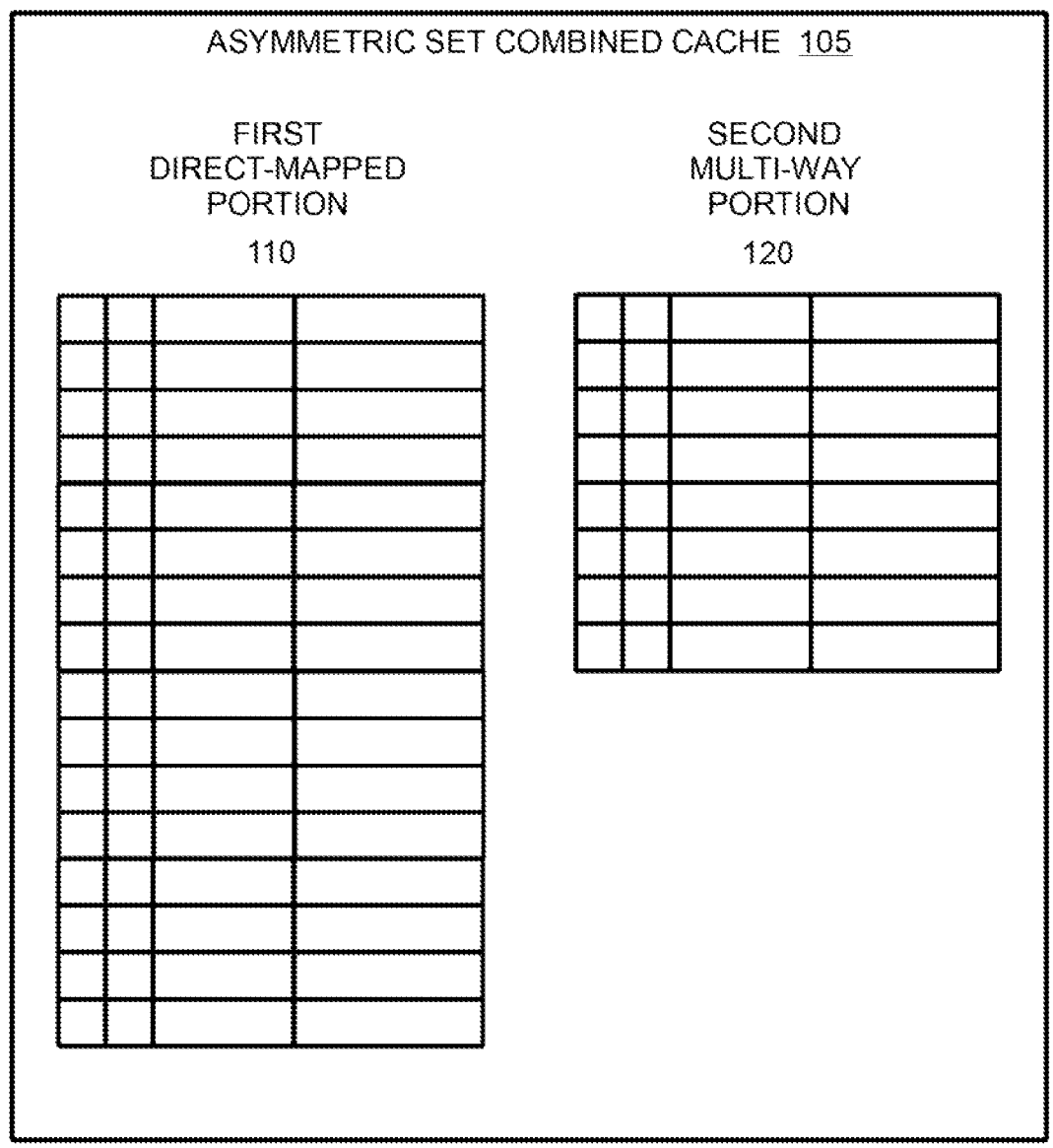
FIG. 1 is an illustration of an asymmetric set combined cache according to an embodiment.

Embodiments described herein are generally directed to an asymmetric set combined cache.

For the purposes of this description:

"Cache memory" or "cache" means a memory to store frequently used information from another memory, such as from a main memory.

"Main memory" or "primary memory" is computer memory that a processor or computer primarily accesses for programs and data. Main memory is generally random access memory (RAM).

More specifically, a CPU cache is a cache utilized by a central processing unit (CPU) of a computer to access frequently used addresses and thus reduces accesses to data from the main memory. The cache is a smaller, faster memory that stores data from frequently used main memory locations. The data cache is generally organized as a hierarchy of more cache levels, with L1 being a small and fast cache that is closest to the processor core, with L2 and L3 being progressively larger and slower caches that are progressively farther away from the CPU.

"Direct-mapped cache" or 'direct-mapped memory cache" means a cache for which any particular element of a memory is mapped to a certain single cache location in the cache memory.

"Multi-way cache" or "multi-way memory cache" means a cache for which any particular element of a memory is mapped to a certain set of multiple cache locations in the cache memory. For example, a 2-way memory cache is a cache for which a particular location in the main memory is mapped to a set of two memory locations in the cache memory. In contrast a fully associative cache memory is a cache memory for which any particular location in the main memory may be cached to any location in the cache memory.

In a particular application of 2LM (two-level memory, including a near memory and a far memory) technology, solutions for cache implementation may include:

(1) Multi-way cache (MW) that requires a very large tag. On very large near-memory caches, it is impractical to maintain all of the tag on the central processing unit (CPU) die.

(2) Direct-mapped cache (DM), where the direct-mapped cache may utilize spare error-correcting code (ECC) bits in High-Bandwidth Memory (HBM) for the tag in metadata. ("High Bandwidth Memory (HDM) DRAM", JEDEC Standard JESD235, October 2013)

In a processing environment, the direct-mapped cache has advantages of flow simplicity and a simple implementation that can use memory metadata (spare-ECC bits) for the cache tags. However, a direct-mapped cache has a disadvantage of low associativity and as result pinning (locking addresses in the cache) is also problematic. In contrast, a multi-way cache can address associativity and pinning issues. However, the multi-way cache generally cannot utilize the memory metadata bits to provide the cache tags required for the cache, and as a result can become extremely large.

Such issues may be resolved at least in part by a complimentary multi-way cache operating cooperatively with the direct-mapped cache. A particular solution may include utilize a multi-way cache as a "victim cache" to the main direct-mapped cache. In general a victim cache is a cache used to hold data (such as lines of cached data) that has been evicted from a CPU cache upon replacement. Thus, if a multi-way cache is acting a victim cache for a direct-mapped cache, then when data is replaced in the direct-mapped cache, it is written into the multi-way cache. This flow addresses associativity issues and allows pinning of data in a cache. However, a cost of the implementation is numerous transfers between the main direct-mapped cache and victim multi-use cache.

In some embodiments, a single combined cache includes a first direct-mapped portion and a second multi-way portion, wherein the direct-mapped and multi-way portions are managed by a coordinated replacement policy. In some embodiments, the coordinated replacement policy provides that new filled data can replace data in either of the cache portions according to the replacement policy. In this manner, data transfers between two caches may be avoided, contrary to a victim cache implementation. In some embodiments, a solution thus includes combining the two solutions with a coordinated replacement policy that addresses both cache portions, without any data transfers between the data arrays of the cache portions.

Implementation of an asymmetric cache solution combining a direct-mapped cache portion and a multi-way cache portion allows a simple scalability. In some embodiments, a size of the multi-way cache portion is derived at least in part by one or more of pinning requirements and conflict-rate of the direct-mapped cache portion. The two cache portions don't require scaling together because pinning requirements do not vary significantly between memory units, and the direct-mapped conflict can be resolved with a relatively small multi-way cache. The overhead of the direct-mapped portion is minimal and thus this portion can be extended to any size with a relatively low cost.

FIG. 1 is an illustration of an asymmetric set combined cache according to an embodiment. In some embodiments, in order to overcome the respective issues of the direct-mapped cache and the multi-way cache, an asymmetric set combined memory 100 (also referred to as the combined cache) is formed and utilized. In some embodiments, the combined cache 100 is partitioned into two cache portions—a first direct-mapped portion 110 (also referred to as the first cache portion) and a second multi-way portion 120 (also referred to as the first cache portion), wherein the first direct-mapped portion is larger than the second multi-way portion. The first cache portion 110 and second cache portion 120 are illustrated for simplicity and are not intended to illustrate scale or location of the first cache portion 110 and second cache portion 120 within the combined cache 100. The second multi-way portion may be a two-way cache as described above, but embodiments are not limited to a particular number of ways in a multi-way cache. In some embodiments, the combined cache is operable to cache data from a main memory 130. Main memory may include, but is not limited to dynamic random access memory (DRAM).

Figure 2:
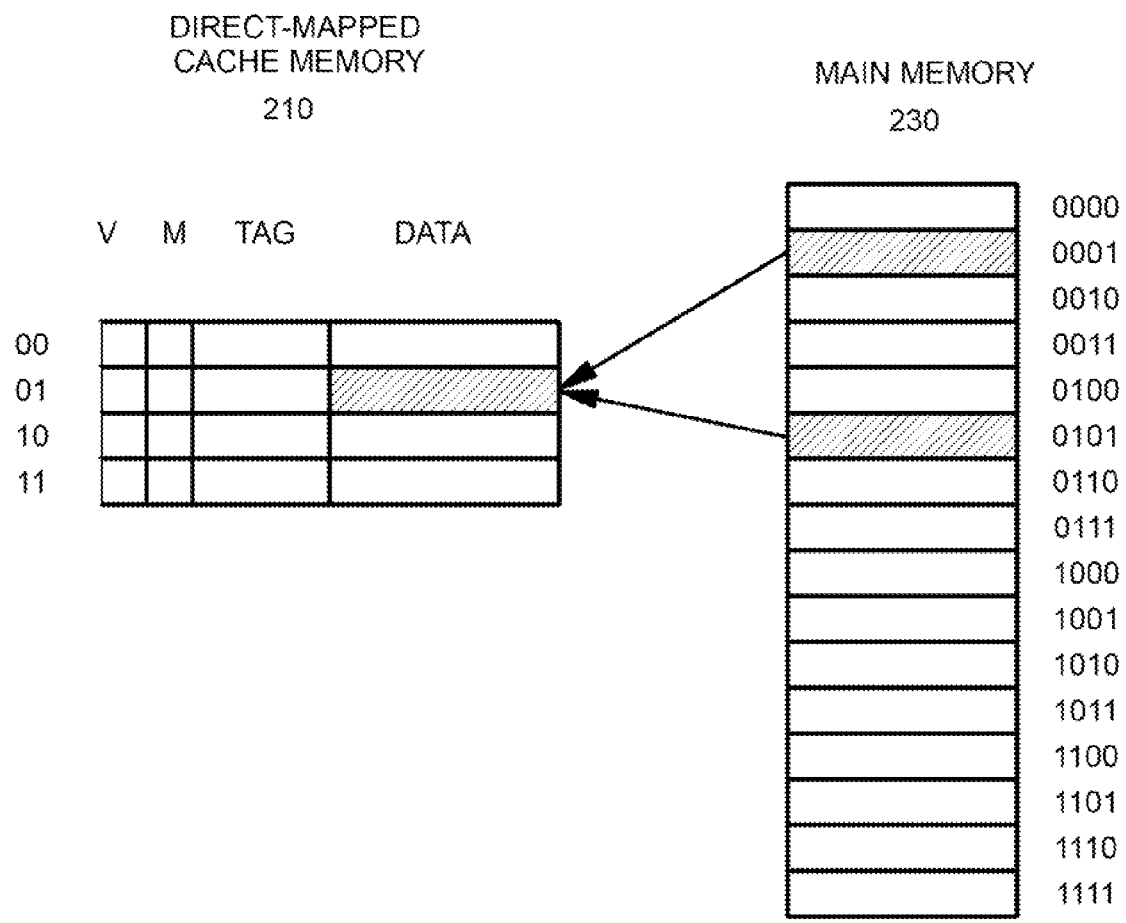
FIG. 2 is an illustration of a direct-mapped cache.

FIG. 2 is an illustration of a direct-mapped cache. A direct-mapped cache, such as the direct-mapped portion 110 illustrated in FIG. 1, is a cache for which any particular location of memory is mapped to a specific cache location in the cache memory. For example, FIG. 2 illustrates a direct-mapped cache memory 210 for caching of data contained in locations of main memory 230, where in this simple example the cache memory 210 includes four cache lines and the main memory 230 includes 16 data locations. As illustrated, each cache line of the cache memory includes at least a valid field (indicated as "V", for a valid bit indicating whether any data has been stored in the cache line), a modified (or dirty) field (indicated as "M", for a modified bit indicating whether the corresponding block of memory has been changed), a tag field to hold the tag for an entry, and a data field to hold cache data. Each location of the main memory 230 is mapped to a single cache line for storage in the cache memory. For example, location 0001 of the main memory is mapped to line 01 of the cache memory 210. However, location 0101 is also mapped to the same line 01 in the direct-mapped cache memory 210, as well as certain other locations of the main memory. For this reason, data may be replaced often in the direct-mapped cache memory depending on what memory locations are accessed.

Figure 3:
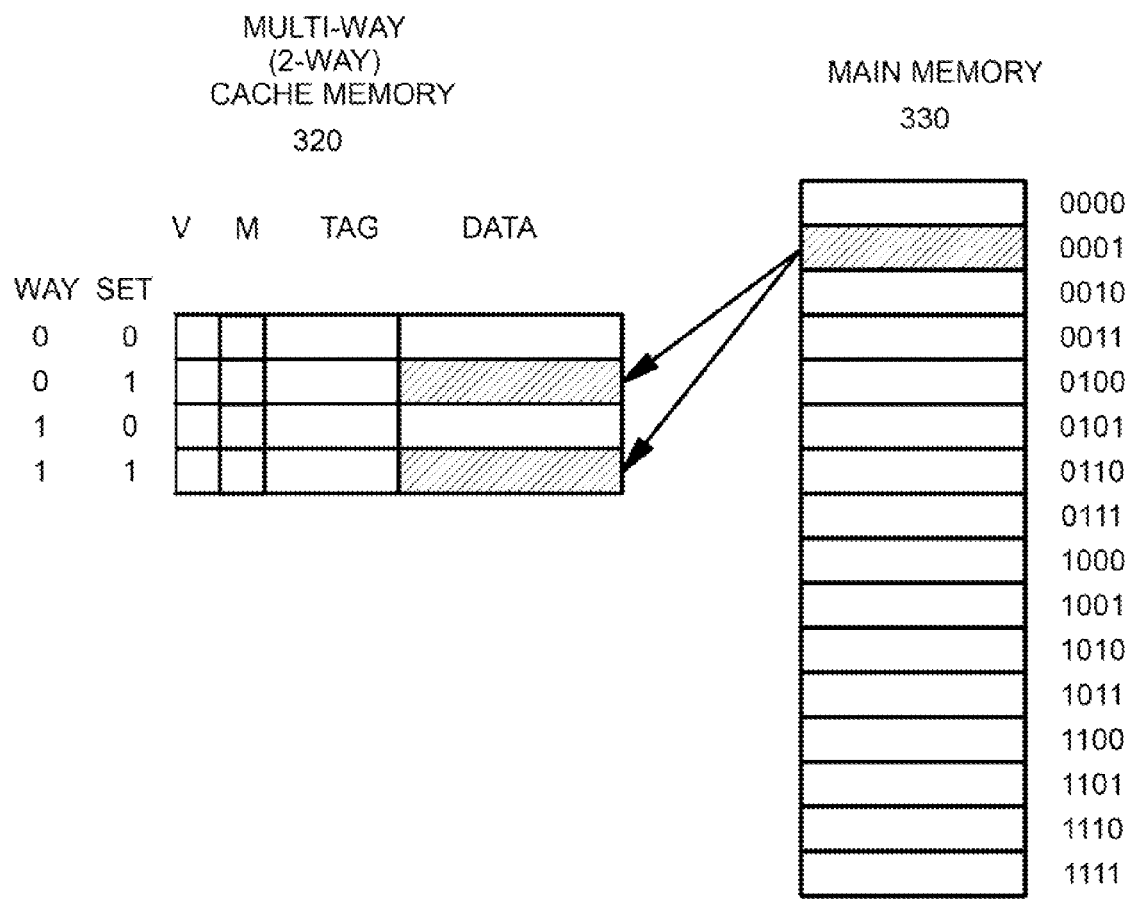
FIG. 3 is an illustration of a multi-way cache memory.

FIG. 3 is an illustration of a multi-way cache memory. As shown in FIG. 3, a multi-way cache memory, such as the second multi-way portion 120 illustrated in FIG. 1, includes multiple ways for cache operation. A multi-way cache may include, but is not limited to, a 2-way cache memory 320 for caching of data from a main memory 330. With a 2-way cache memory 320, each location of the main memory 330 is mapped to two cache lines of the cache memory 320.

For example, location 0001 of the main memory 330 is mapped to a cache line of the multi-way cache memory 110 in each of two ways, 0001 of the main memory 330 being mapped to line 01 (way=0 and set=1) and line 11 (way=1 and set=1) of the multi-way cache memory 330.

Referring again to FIG. 1, combined cache 100 may operate to cache data from a main memory 130, such as the main memory 230 illustrated in FIG. 2 or main memory 330 illustrated in FIG. 3. The combined cache 100 may be a part of a processor, such as a CPU for a computing system. In some embodiments, a combined cache including a small multi-way cache portion and a large direct-mapped portion requires only a small on-die control array (including LRU (Least Recently Used) bits for an LRU implementation), validity bit V, modified (dirty) bit M, and tag), can be implemented as metadata of the near-memory chips.

In an implementation of an embodiment of a asymmetric set combined cache, the following characteristics may be applied:

(a) There is a same size in both cache portions 110 and 120 of the combined cache 100 for the cache line (CL), or for the sectored cache line (SPL) if the combined cache 100 is a sectored cache.

(b) A total size of the combined cache 100:

$$\text{Size\_Total}=2^n\text{CL's or }2^n\text{SPL's} \quad [1]$$

(c) A number of sets in multi-way portion 120:

$$\text{Sets\_MW}=2^m \quad [2]$$

(d) A number of ways for the multi-way portion 120:

$$\text{Ways\_MW}=2^w \quad [3]$$

(e) The relationship between factors for size of the combined cache 100, the number of sets, and number of ways:

$$n>m+w \quad [4]$$

The following may be concluded based on the above characteristics provided in equations [1] to [4] for a combined cache:

(a) A size of direct-mapped portion 110:

$$\text{Size\_DM}=2^n-(2^{(m+w)}) \quad [5]$$

(b) A ratio between direct-mapped number of sets and multi-way number of sets is:

$$r=(2^n-(2^{(m+w)}))/(2^{(m+w)})=(2^{(n-m-w)})-1 \quad [6]$$

where r is always an integer positive number.

(c) A calculation of direct-mapped-set-msb's (most significant bit) (dmsm) is:

$$\text{dmsm}=\text{tag mod }r \quad [7]$$

where tag is address CL_address {max-address-bit:n}

(d) The value CL/SPL is $2^1$. For the purpose of simplicity, CL_address may be referred to as address bits {max-address-bit:1} or:

$$\text{CL\_address}==\text{address}>>1(\text{shift right,zero fill}) \quad [8]$$

In some embodiments, each address of a main memory to be cached to an asymmetric set combined cache can be mapped into each of the following:

(a) One of ($2^w$) ways in multi-way set #(CL_address bits $\{m-1:0\}$); and (b) A single set in direct-mapped is {DMSM||CL_address $\{n-1:0\}$}

As a result, to each set in multi-way portion it is possible to associate the sets that have the same address bits CL_address $\{m-1:0\}$. In other words, there are ($r*2^{(n-m-w)}$) sets in the direct-mapped portion that are mapped to each of the sets in the multi-way cache.

In a particular example of a combined asymmetric set cache, the characteristic of the cache may be as follows:

Total memory: 4 M CL's (n=22);
16 ways (w=4);
Multi-way cache: 1 M CL's (m=16);
Direct-mapped cache 3 M CL's;
CL_address bits 29:0;
Set for multi-way portion is CL_address $\{15:0\}$; and
Set for direct-mapped portion: (tag mod 3)||CL_address $\{19:0\}$.

For each set in the multi-way portion, there are 48 associated sets, which have identical address bits CL_address $\{15:0\}$. These are:

(tag mod 3=0)*CL_address$\{19:16\}$;
(tag mod 3=1)*CL_address $\{19:16\}$; and
(tag mod 3=2)*CL_address$\{19:16\}$.

Figure 4:
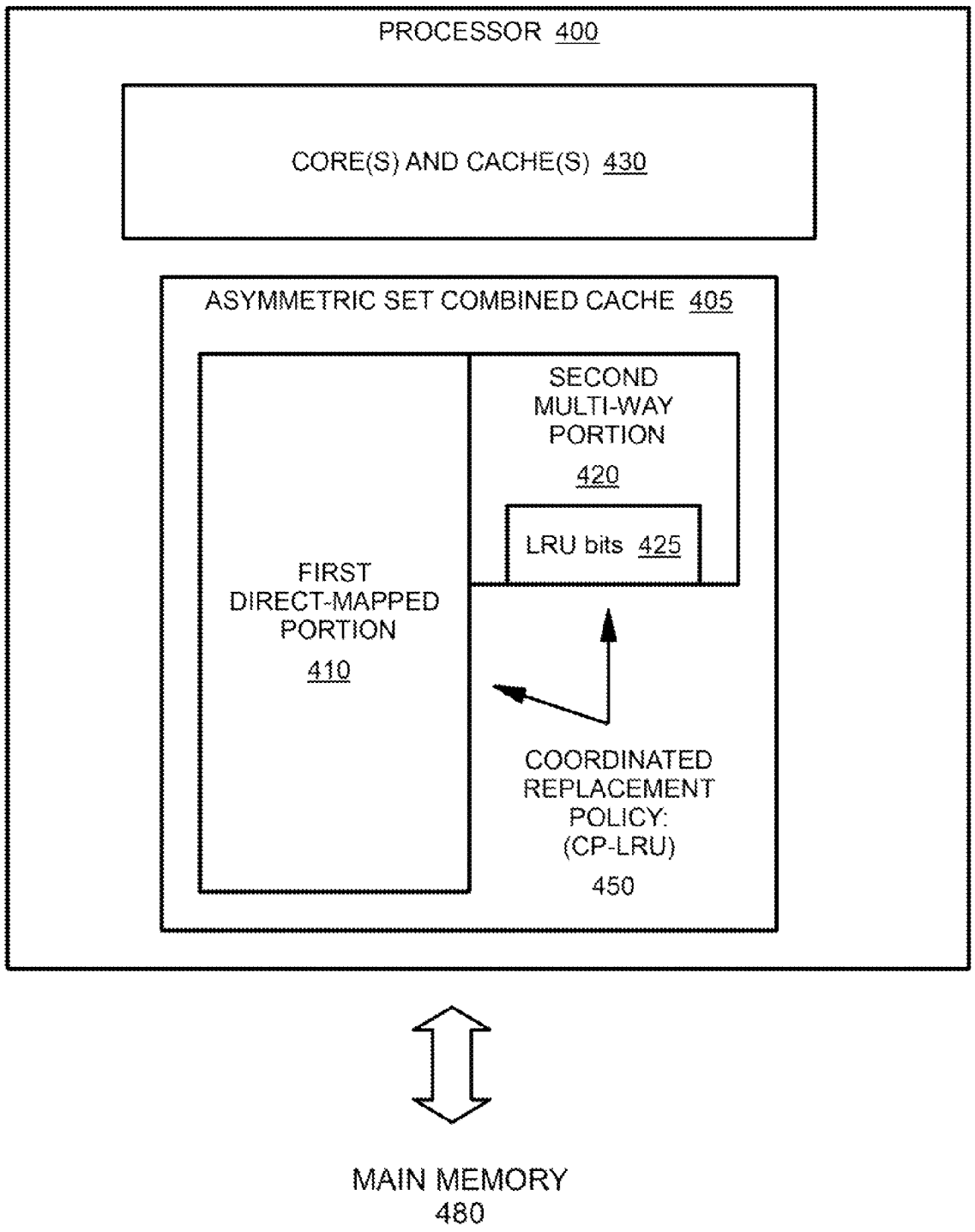
FIG. 4 is an illustration of a processor including an asymmetric set combined cache with coordinated replacement policy according to an embodiment.

FIG. 4 is an illustration of a processor including an asymmetric set combined cache with according to an embodiment. In some embodiments, in addition to other components that are not illustrated, a processor 400 includes one or more cores 430 for the processing of data and one or more cache memories for storage of frequently used data, including an asymmetric set combined cache 405 (also referred to as the combined cache) includes a first direct-mapped portion 410 (also referred to as the first cache portion) and a second multi-way portion 420 (also referred to as the second cache portion), wherein the first direct-mapped portion is larger than the second multi-way portion. As with FIG. 1, the first cache portion 410 and second cache portion 420 of the combined cache 405 are illustrated for simplicity and are not intended to illustrate scale or location of the first cache portion 410 and second cache portion 420 within the combined cache 405, or the scale or location of the combined cache within a processor 400.

In some embodiments, the combined cache 405 is subject to a coordinated replacement policy 450 for the first cache portion 410 and the second cache portion 420. In some embodiments, the coordinated replacement policy is a policy, which may be referred to herein as a "combined pseudo least recently used" (combined pseudo LRU, or CP-LRU) policy, in which least recently used policies are applied in a coordinated fashion to data stored in the first direct-mapped portion 410 and the second multi-way portion 420. However, the coordinated replacement policy is not limited to a combined pseudo LRU implementation, and may implement other replacement policies in other embodiments. In one example, an alternative embodiment may utilize a random replacement algorithm in which the location chosen for replacement in the first direct-mapped portion 410 or the second multi-way portion 420 is chosen at random.

In application of the coordinated replacement policy 450 it is noted that an LRU application generally should be implemented on a CPU die, and even one bit per direct-mapped set may be very expensive, with a 64 byte cache line the LRU may require 2 MB (megabytes) for each GB (gigabyte) of memory, or 16 MB for 8 GB of memory. In some embodiments, a coordinated replacement policy eliminates the need for LRU bits on the first direct-mapped portion 410 and instead uses only the second multi-way portion 420 for this purpose, illustrated as LRU bits 425 in FIG. 4.

In some embodiments, a coordinated replacement policy for 450 for a combined cache 405 that utilizes an LRU replacement policy implements two LRU bits 425 for each way in the multi-way portion 420 of the combined cache 405 to indicate least recently used (LRU) comparisons. In some embodiments, the bits of a 2-bit MW-LRU for a certain way (referred to here as the first way) include:

Bit 0: comparing an entry of the first way versus other ways of the multi-way portion, indicating that the LRU is stored in the first way (MW-LRU);

Bit 1: comparing an entry of the first way versus a corresponding direct-mapped location, indicating that the LRU is located in the first way (LRU-vs-DM); and No LRU bits per direct-mapped set.

However, embodiments are not limited to a particular bit order or number of bits, and may include additional bits for a way of the multi-way portion.

The implementation of the combined pseudo LRU policy is based on the fact that decisions are taken between multi-way entries, or between the multi-way entries and a single direct-mapped set. There is no LRU relationship between different direct-mapped sets as the direct mapping ensures that any location in main memory is mapped to a single cache location.

Further, it is noted that a number of LRU bits is proportional to the number of multi-way sets, which is smaller than a number of direct-mapped sets in the asymmetric set combined cache. The size of the multi-way cache portion 420 is not required to scale-up linearly with the size of the combined cache and thus the LRU cost is much smaller than conventional LRU on direct-mapped cache. This characteristic is very significant for near-memory cache of multiple GB's as it operates to significantly reduce physical costs for the cache on the CPU.

In some embodiments, on access to the combined cache 405, in addition to lookup, there is a comparison with all ways on the direct-mapped set selection (bits 29:26 of address & tag mod R). The result is a 16-bit vector, called DM-match-Vector.

Figure 5:
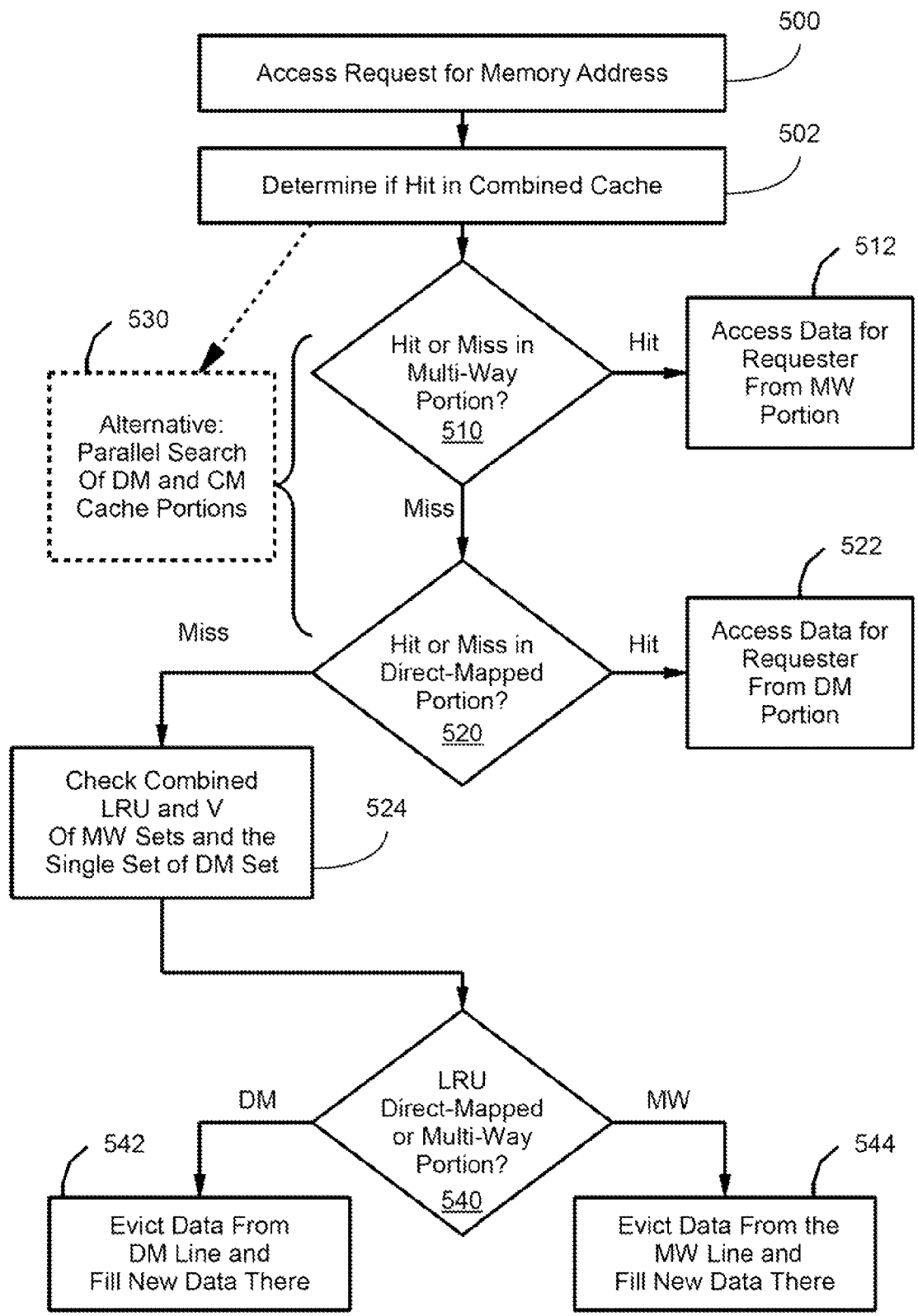
FIG. 5 is a flowchart to illustrate a process for combined cache operation.

FIG. 5 is a flowchart to illustrate a process for combined cache operation. In some embodiments, upon an access to a memory address in a main memory (relating to CL_address) 500, a determination is made whether there is a hit in a combined cache 502 (indicated that the address is present in the combined cache), the combined cache including a direct-mapped portion and a multi-way portion, such as illustrated in combined cache 100 in FIG. 1. In some embodiments, a determination is made whether there is a hit in the multi-way portion 510. In some embodiments, the lookup for the multi-way portion is very quick because of the location of the multi-way tag on the CPU die and because of the relatively small size of the multi-way cache portion. If the lookup is a tag hit, then the data is accessed for the requester from the multi-way cache portion 512.

In some embodiments, if there is a miss in the multi-way cache portion 510, there is then a determination whether there is a hit or miss in the direct-mapped cache portion 520, which may be performed by reading the direct-mapped address, and comparing the metadata tag for the direct-mapped cache. However, embodiments are not limited to a particular order of lookup for the multi-way cache portion and the directed-mapped cache portion. In an alternative embodiment, there may be a parallel lookup process for both the direct-mapped cache portion and the multi-way cache portion 530.

In some embodiments, if there is a miss in the direct-mapped cache portion 540, and thus a miss in both portions of the combined cache, there is a check of the LRU of the multi-way sets and the V (valid) bit of each of the multi-way sets and the direct-mapped set 524. If the least recently used of these sets is contained in the direct-mapped portion 540, then the data is evicted from the direct-mapped cache line and the new data is filled (i.e., the new data is stored) there 542. If the least recently used of these sets is contained in the multi-way portion 540, then the data is evicted from the multi-way cache line and the new data is filled there 544. A determination of a location of the least recently used set 530 may include application of, for example, the priorities illustrated in FIG. 7. However, embodiments are not limited to an LRU replacement policy, and thus in other embodiments elements 524 and 540 may implement a different policy to determine the replacement location, including, in one example, a random replacement policy which may select the direct-mapped cache portion or the multi-way cache portion at random.

Figure 6A:
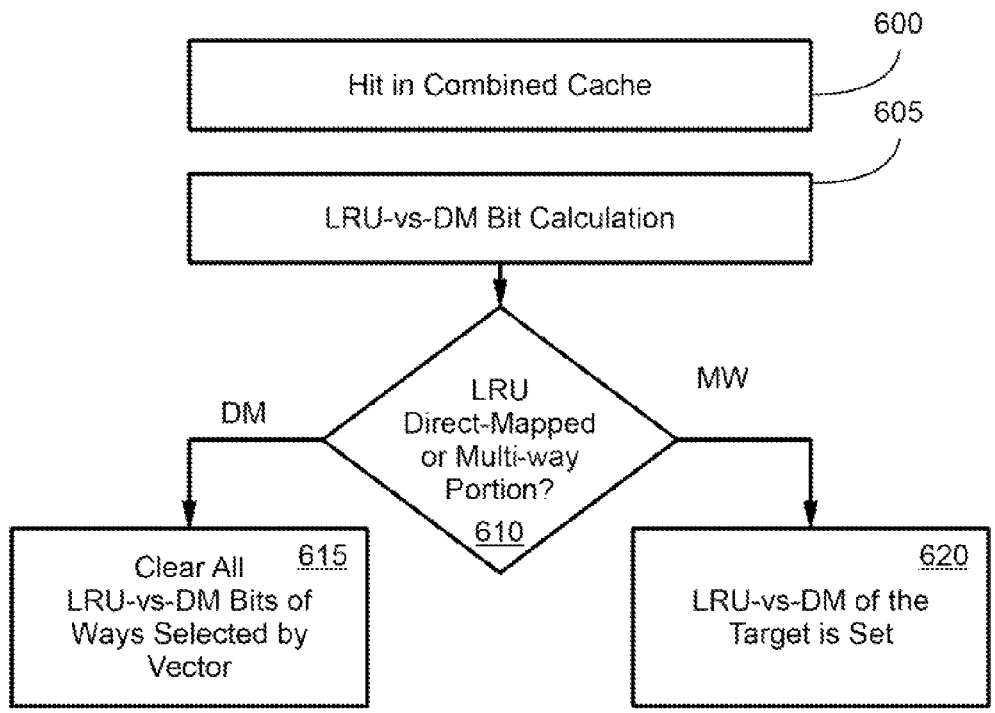
FIG. 6A is a flowchart to illustrate a calculation of a first part of a combined pseudo LRU according to an embodiment.

FIG. 6A is a flowchart to illustrate a calculation of a first part of a combined pseudo LRU according to an embodiment. As illustrated in FIG. 6A, upon there being a hit on a combined cache 600, the combined cache including a direct-mapped portion and a multi-way portion, such as illustrated in combined cache 100 in FIG. 1, there is a calculation of LRU bits 605. In some embodiments, the LRU-vs-DM bit calculation is as follows:

(a) If the target is in the DM portion of the combined cache 610, then all LRU-vs-DM bits of ways selected by the vector are cleared (such as set to zero) 615, indicating that the DM is more recently used than all MW entries that relate to the same DM set.

(b) If the target is in the MW portion of the combined cache 610, the LRU-vs-DM bit of the target is set, 620 indicating that the target of the MW is more recently used than the DM set.

Figure 6B:
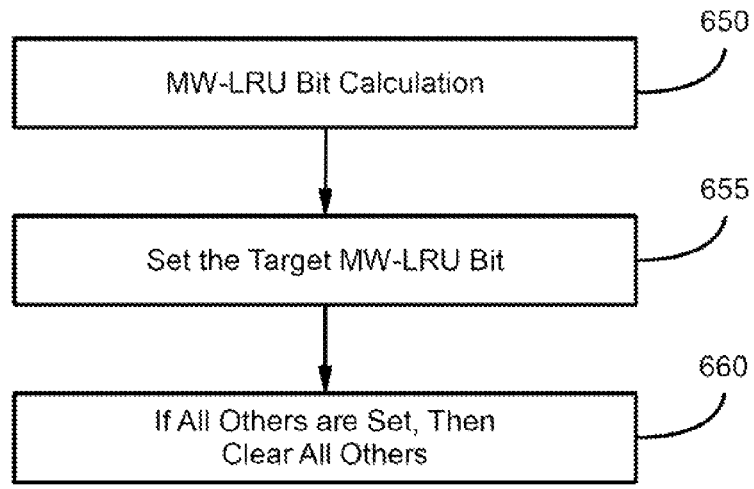
FIG. 6B is a flowchart to illustrate a calculation of a second part of a combined pseudo LRU according to an embodiment.

FIG. 6B is a flowchart to illustrate a calculation of a second part of a combined pseudo LRU according to an embodiment. In some embodiments, the MW-LRU bit calculation 650 is as follows:

(a) Set the target MW-LRU bit 655; and (b) If all other MW-LRU bits are set, then clear all others 660.

Figure 7:
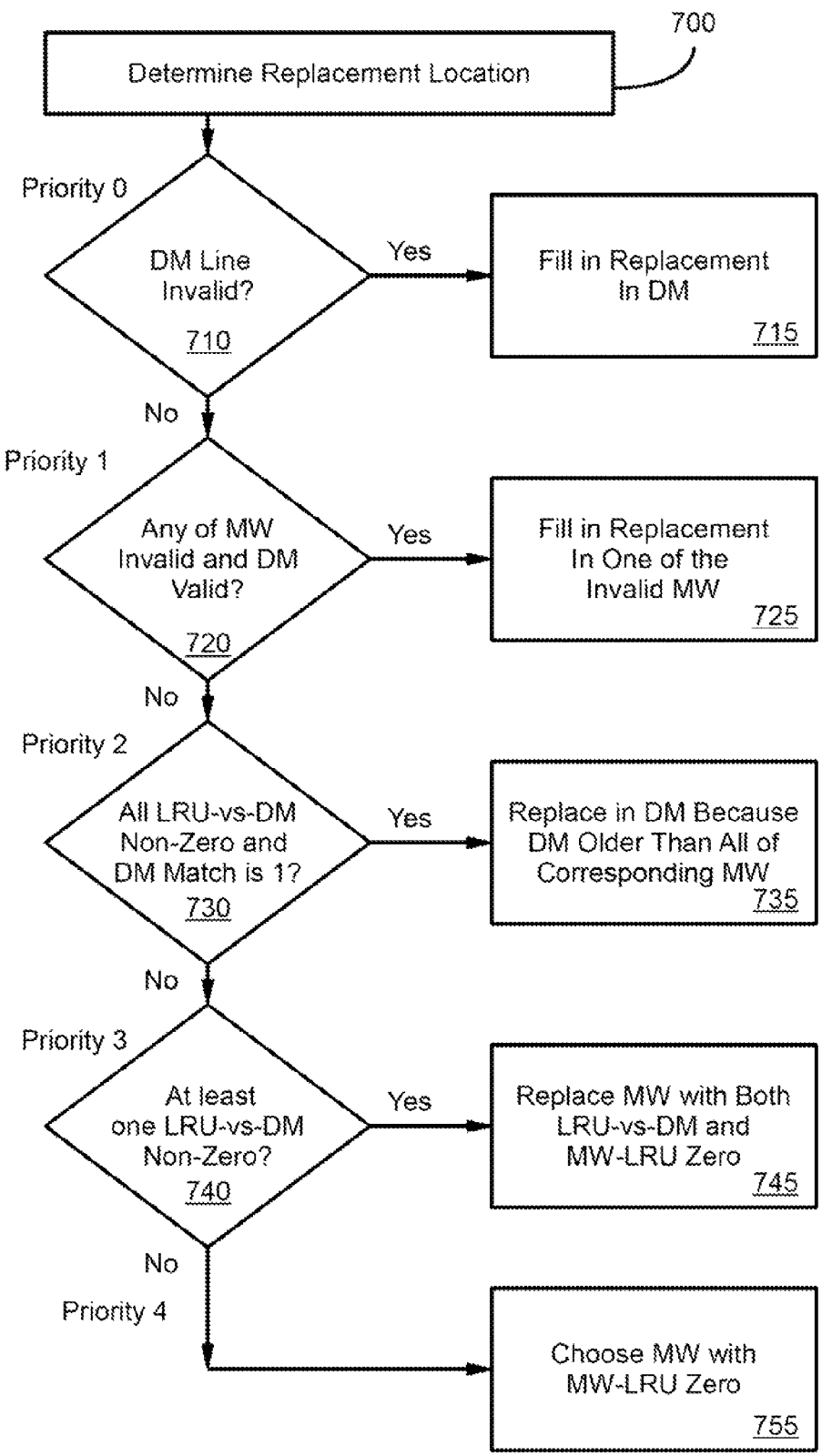
FIG. 7 is a flowchart to illustrate priority of replacement in a combined cache according to an embodiment.

FIG. 7 is a flowchart to illustrate priority of replacement in a combined cache according to an embodiment. However, embodiments are not limited to a particular set of priorities for replacement, and may include other types of priorities in other implementations. In the case of a cache miss for a combined cache that includes a direct-mapped cache portion and a multi-way cache portion, such as combined cache 100 illustrated in FIG. 1, there is a possibility of replacing data in the direct-mapped portion or the multi-way portion. In some embodiments, a choice of location for data replacement after a cache miss in combined cache according to a coordinated replacement policy is performed according to multiple priorities. In some embodiments, the priorities for replacement are based on validity and age of data contained in the direct-mapped and multi-way portions.

In an example, priorities for replacement may include, but are not limited to, the following:

For Priority 0 (a first highest priority), if the direct-mapped cache line is invalid 710 (valid data has not been stored in the direct-mapped cache line), then the data is placed in the direct-mapped cache line 715. This is done in order to store valid data in the direct-mapped portion while there is an opportunity.

If not, for Priority 1 (a second priority that is a lower priority than the first priority), if any of multi-way cache lines are invalid when the direct-mapped cache line is valid 720, then the data is filled in the invalid multi-way cache line to store valid data in such location while there is an opportunity 725.

If not, for Priority 2 (a third priority that is a lower priority than the second priority), if all LRU-vs-DM bits of a non-zero DM-match-Vector are '1', element 730, then replace the value in the direct-mapped portion because the direct-mapped entry is older than all corresponding multi-way entries 735.

If not, for Priority 3 (a fourth priority that is a lower priority than the third priority), if a multi-way value has both LRU-vs-DM and MW-LRU as zero, element 740, then replace such value 745, which is older than its corresponding direct-mapped entry and it is part of the older entries in the multi-way portion.

If not, then, for Priority 4 (a fifth priority that is a lower priority than the fourth priority), choose a multi-way entry with MW-LRU having value zero 755.

Figure 8:
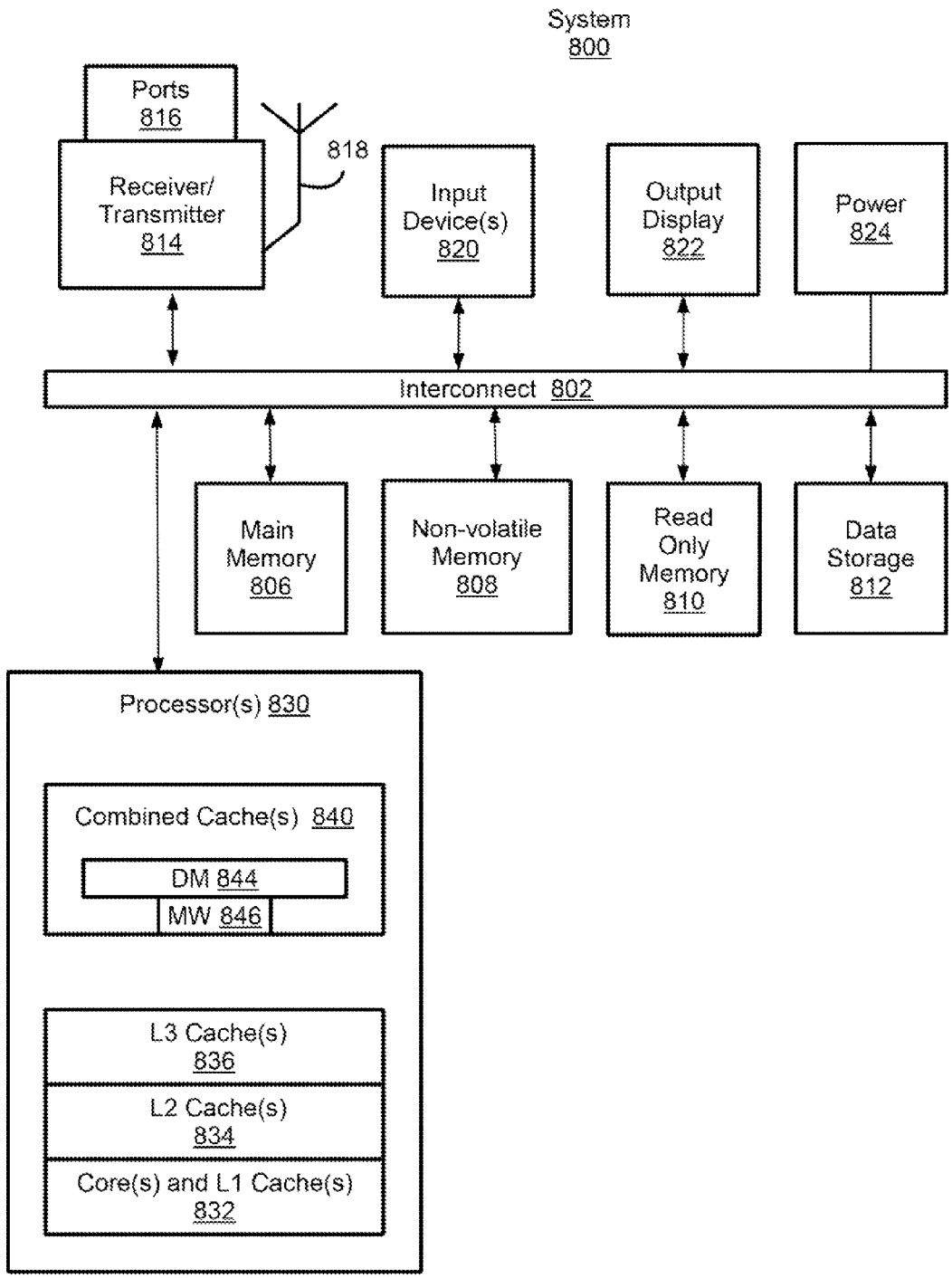
FIG. 8 is an illustration of an embodiment of an electronic apparatus or system including a combined cache memory.

FIG. 8 is an illustration of an embodiment of an electronic apparatus or system including a combined cache memory. In this illustration, certain standard and well-known components that are not germane to the present description are not shown. Elements shown as separate elements may be combined, including, for example, an SoC (System on Chip) combining multiple elements on a single chip. The apparatus or system (referred to generally as a system 800) may include, but is not limited to, a computing system.

In some embodiments, the system 800 may include a processing means such as one or more processors 830 coupled to an interconnect 802 for processing information. The processors 830 may comprise one or more physical processors and one or more logical processors. In some embodiments, the processors may include one or more general-purpose processors or special-processor processors. In addition to numerous other elements that are not illustrated, processors 830 may include one or more cores and L1 caches 832, and one or more L2 caches 834. Further, one or more L3 caches 836 may be a portion of a processor 830, may be installed in a motherboard, or may otherwise be implemented in the system 800.

In some embodiments, the processors 830 may include an asymmetric set combined cache 840 such as illustrated in FIGS. 3 and 4, a combined cache 840 including a direct-mapped portion 844 and a multi-way portion 846, the direct-mapped portion 844 being larger than the multi-way portion 846. The structure of the processors and caches may vary depending on the implementation. In one embodiment, the cores and L1, L2, and L3 caches 832-836 may interface with the combined cache 840, and the combined cache 840 may interface with the external interconnect. In another embodiment, I/O accesses from the cores 832 may bypass the combined cache 840. However, embodiments are not limited to these particular implementations. In some embodiments, the direct-mapped portion 844 and the multi-way portion 846 are subject to a coordinated replacement policy, such as, in one example, an LRU-based replacement policy, which may be implemented as illustrated in FIGS. 5, 6A, 6B, and 7.

The interconnect 802 is a communication means for transmission of data. The interconnect 802 is illustrated as a single interconnect for simplicity, but may represent multiple different interconnects or buses and the component connections to such interconnects may vary. The interconnect 802 shown in FIG. 8 is an abstraction that represents any one or more separate physical buses, point-to-point connections, or both connected by appropriate bridges, adapters, or controllers.

In some embodiments, the apparatus 800 further comprises a random access memory (RAM) or other dynamic storage device or element as a main memory 806 for storing information and instructions to be executed by the processors 830. Main memory 806 may include, but is not limited to, dynamic random access memory (DRAM). In some embodiments, data in the main memory 806 is cached utilizing one or more caches, including one or more combined caches 840. The system 800 may further include one or more non-volatile memory elements 808, including, for example, flash memory, for the storage of certain elements. The system 800 also may comprise a read only memory (ROM) 810 or other static storage device for storing static information and instructions for the processors 830, and data storage 812, such as a solid state drive, for the storage of data.

In some embodiments, the system 800 includes one or more transmitters or receivers 814 coupled to the interconnect 802. In some embodiments, the system 800 may include one or more antennae 818, such as dipole or monopole antennae, for the transmission and reception of data via wireless communication using a wireless transmitter, receiver, or both, and one or more ports 816 for the transmission and reception of data via wired communications.

In some embodiments, system 800 includes one or more input devices 820 for the input of data, including hard and soft buttons, a joy stick, a mouse or other pointing device, voice command system, or gesture recognition system.

In some embodiments, the system 800 includes an output display 822, where the display 822 may include a liquid crystal display (LCD) or any other display technology, for displaying information or content to a user. In some environments, the display 822 may include a touch-screen that is also utilized as at least a part of an input device 822.

The system 800 may also comprise a battery or other power source 824, which may include a solar cell, a fuel cell, a charged capacitor, near field inductive coupling, or other system or device for providing or generating power in the apparatus 800. The power provided by the power source 824 may be distributed as required to elements of the system 800.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, compact disk read-only memory (CD-ROM), and magneto-optical disks, read-only memory (ROM), random access memory (RAM), erasable programmable read-only memory (EPROM), electrically-erasable programmable read-only memory (EEPROM), magnet or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

In some embodiments, a processor includes one or more processing cores for processing of data; and a cache memory to cache data for the one or more processing cores, wherein the cache memory includes a first cache portion including a direct-mapped cache, and a second cache portion including a multi-way cache. In some embodiments, the cache memory includes asymmetric sets in the first cache portion and the second cache portion, the first cache portion being larger than the second cache portion; and wherein a coordinated replacement policy for the cache memory provides for replacement of data in the first cache portion and the second cache portion.

In some embodiments, there is no transfer of data between the first cache portion and the second cache portion.

In some embodiments, each address of a main memory may be cached in a location in any of ways of the multi-way portion or a single location in the direct-mapped portion.

In some embodiments, the coordinated replacement policy includes application of a least recently used (LRU) algorithm.

In some embodiments, bits for the coordinated replacement policy are stored in the second cache portion for each way of the multi-way portion. In some embodiments, the bits for the coordinated replacement policy for a first way of the multi-way portion include: first bit indicating a least recently used comparison of an entry of the first way with entries of each other way of multi-way portion; and a second bit indicating a least recently used comparison of the entry of the first way with an entry of a corresponding direct-mapped location.

In some embodiments, a size of the multi-way cache portion does not scale linearly with a size of the direct-mapped portion.

In some embodiments, a size of the multi-way portion is based at least in part on one or more of pinning requirements and conflict-rate of the direct-mapped portion.

In some embodiments, for a total size of the cache memory being 2n cache lines or sectored cache lines, a number of sets in the multi-way portion being 2m, and a number of ways for the multi-way portion being 2w, n is greater than a sum of m and w.

In some embodiments, a method includes: receiving an access request for a memory address in a main memory; determining whether there is a hit or miss in a cache for the memory address, wherein the cache memory includes a first cache portion, the first cache portion including a direct-mapped cache, and a second cache portion, the second cache portion including a multi-way cache, the second cache portion being smaller than the first cache portion; for a hit in either the first cache portion or the second cache portion, accessing requested data in the cache portion for which there is a hit; and for a miss in both first cache portion and the second cache portion, replacing data for the memory address in either the first cache portion of the second cache portion according to a coordinated replacement policy for the first cache portion and the second cache portion.

In some embodiments, an address of the main memory may be mapped to a location in any of ways of the multi-way portion or to a single location in the direct-mapped portion.

In some embodiments, replacing data according to the coordinated replacement policy includes application of a least recently used (LRU) algorithm.

In some embodiments, the method further includes storing bits for the coordinated replacement policy in the second cache portion. In some embodiments, bits for the coordinated replacement policy for a first way of the multi-way portion include a first bit indicating a least recently used comparison of an entry of the first way with entries of each other way of multi-way portion, and a second bit indicating a least recently used comparison of the entry of the first way with an entry of a corresponding direct-mapped location.

In some embodiments, the application of the LRU algorithm includes a plurality of priorities for a replacement location in the first cache portion or the second cache portion. In some embodiments, the plurality of priorities include: a first priority providing for storing data to be cached in a mapped entry of the direct mapped portion if valid data has not been stored in the mapped entry; a second priority, the second priority being lower than the first priority, providing for storing data to be cached in a mapped cache line of the multi-way portion if valid data has not been stored in the mapped cache line; a third priority, the third priority being lower than the second priority, providing for storing data to be cached in the cache line in the direct-mapped portion if a direct-mapped entry is older than all corresponding multi-way entries; a fourth priority, the fourth priority being lower than the third priority, providing for storing data to be cached in a cache line of a certain way of the multi-way portion if an entry of the certain way is older than a corresponding direct-mapped entry and it is part of the older entries in the multi-way portion; and a firth priority, the fifth priority being lower than the fourth priority, providing for storing data to be cached in a cache line of any of the ways of the multi-way portion.

In some embodiments, a computing system includes a main memory for the storage of data for the computing system; a transmitter and receiver for wireless transmission of data; a transmitter and receiver for wireless transmission of data; and a processor including: one or more processing cores for processing of data; and a cache memory to cache data from a main memory for the one or more processing cores, wherein the combined cache memory includes a first cache portion, the first cache portion including a direct-mapped cache, and a second cache portion, the second cache portion including a multi-way cache. In some embodiments, the cache memory is an asymmetric set combined cache, the first cache portion being larger than the second cache portion. In some embodiments, a coordinated replacement policy for the cache memory provides for replacement of data in the first cache portion and the second cache portion.

In some embodiments, each address of the main memory may be cached in a location in any of ways of the multi-way portion or a single location in the direct-mapped portion.

In some embodiments, the coordinated replacement policy includes application of a least recently used (LRU) algorithm. In some embodiments, bits for the coordinated replacement policy are stored in the second cache portion for each way of the multi-way portion. In some embodiments, the bits for the coordinated replacement policy for a first way of the multi-way portion include: a first bit indicating a least recently used comparison of an entry of the first way with entries of each other way of multi-way portion; and a second bit indicating a least recently used comparison of the entry of the first way with an entry of a corresponding direct-mapped location In some embodiments, a non-transitory computer-readable storage medium having stored thereon data representing sequences of instructions that, when executed by a processor, cause the processor to perform operations comprising: receiving an access request for a memory address in a main memory; determining whether there is a hit or miss in a cache for the memory address, wherein the combined cache memory includes a first cache portion, the first cache portion including a direct-mapped cache, and a second cache portion, the second cache portion including a multi-way cache; for a hit in either the first cache portion or the second cache portion, accessing requested data in the cache portion for which there is a hit; and for a miss in both the first cache portion and the second cache portion, replacing data for the memory address in either the first cache portion of the second cache portion according to a coordinated replacement policy for the cache memory.

In some embodiments, an address of the main memory may be mapped to a location in any of ways of the multi-way cache of the second cache portion or to a single location in the direct-mapped cache of the first cache portion.

In some embodiments, replacing data according to the coordinated replacement policy includes application of a least recently used (LRU) algorithm.

In some embodiments, an apparatus includes means for receiving an access request for a memory address in a main memory; means for determining whether there is a hit or miss in a combined cache for the memory address, wherein the combined cache memory includes: a first cache portion, the first cache portion including a direct-mapped cache, and a second cache portion, the second cache portion including a multi-way cache; means for accessing requested data in a cache portion if there is a hit in either the first cache portion or the second cache portion; and means for replacing data for the memory address in either the first cache portion or the second cache portion according to a coordinated replacement policy for the combined cache if there is a miss in both the first cache portion and the second cache portion.

In some embodiments, an address of the main memory may be mapped to a location in any of ways of the multi-way cache of the second cache portion or to a single location in the direct-mapped cache of the first cache portion.

In some embodiments, the means for replacing data according to the coordinated replacement policy applies a least recently used (LRU) algorithm.

What is claimed is:

1. A processor comprising:
one or more processing cores for processing of data; and
a cache memory to cache data for the one or more processing cores, wherein the cache memory includes:
a first cache portion including a direct-mapped cache, and
a second cache portion including a multi-way cache;
wherein the cache memory includes asymmetric sets in the first cache portion and the second cache portion, the first cache portion being larger than the second cache portion; and
wherein a coordinated replacement policy for the cache memory provides for replacement of data in the first cache portion and the second cache portion.

2. The processor of claim 1, wherein there is no transfer of data between the first cache portion and the second cache portion.

3. The processor of claim 1, wherein each address of a main memory may be cached in a location in any of ways of the multi-way portion or a single location in the direct-mapped portion.

4. The processor of claim 1, wherein the coordinated replacement policy includes application of a least recently used (LRU) algorithm.

5. The processor of claim 4, wherein bits for the coordinated replacement policy are stored in the second cache portion for each way of the multi-way portion.

6. The processor of claim 5, wherein the bits for the coordinated replacement policy for a first way of the multi-way portion include:
a first bit indicating a least recently used comparison of an entry of the first way with entries of each other way of multi-way portion; and
a second bit indicating a least recently used comparison of the entry of the first way with an entry of a corresponding direct-mapped location.

7. The processor of claim 1, wherein a size of the multi-way cache portion does not scale linearly with a size of the direct-mapped portion.

8. The processor of claim 1, wherein a size of the multi-way portion is based at least in part on one or more of pinning requirements and conflict-rate of the direct-mapped portion.

9. The processor of claim 1, wherein for a total size of the cache memory being 2n cache lines or sectored cache lines, a number of sets in the multi-way portion being 2m, and a number of ways for the multi-way portion being 2w, n is greater than a sum of m and w, wherein n, m, and w are positive integers.

10. A method comprising:
receiving an access request for a memory address in a main memory;
determining whether there is a hit or miss in a cache memory for the memory address, wherein the cache memory includes:
a first cache portion including a direct-mapped cache, and
a second cache portion including a multi-way cache, the second cache portion being smaller than the first cache portion;
for a hit in either the first cache portion or the second cache portion, accessing requested data in the cache portion for which there is a hit; and
for a miss in both first cache portion and the second cache portion, replacing data for the memory address in either the first cache portion of the second cache portion according to a coordinated replacement policy for the first cache portion and the second cache portion.

11. The method of claim 10, wherein an address of the main memory may be mapped to a location in any of ways of the multi-way portion or to a single location in the direct-mapped portion.

12. The method of claim 10, wherein replacing data according to the coordinated replacement policy includes application of a least recently used (LRU) algorithm.

13. The method of claim 12, further comprising storing bits for the coordinated replacement policy in the second cache portion.

14. The method of claim 13, wherein bits for the coordinated replacement policy for a first way of the multi-way portion include:
a first bit indicating a least recently used comparison of an entry of the first way with entries of each other way of multi-way portion; and
a second bit indicating a least recently used comparison of the entry of the first way with an entry of a corresponding direct-mapped location.

15. The method of claim 12, wherein the application of the LRU algorithm includes a plurality of priorities for a replacement location in the first cache portion or the second cache portion.

16. The method of claim 15, wherein the plurality of priorities include:

a first priority providing for storing data to be cached in a mapped entry of the direct mapped portion if valid data has not been stored in the mapped entry;

a second priority, the second priority being lower than the first priority, providing for storing data to be cached in a mapped cache line of the multi-way portion if valid data has not been stored in the mapped cache line;

a third priority, the third priority being lower than the second priority, providing for storing data to be cached in the cache line in the direct-mapped portion if a direct-mapped entry is older than all corresponding multi-way entries;

a fourth priority, the fourth priority being lower than the third priority, providing for storing data to be cached in a cache line of a certain way of the multi-way portion if an entry of the certain way is older than a corresponding direct-mapped entry and it is part of the older entries in the multi-way portion; and a fifth priority, the fifth priority being lower than the fourth priority, providing for storing data to be cached in a cache line of any of the ways of the multi-way portion.

17. A computing system comprising:

a main memory for the storage of data for the computing system;

a transmitter and receiver for wireless transmission of data; and a processor including:
  one or more processing cores for processing of data, and
  a cache memory to cache data from the main memory for the one or more processing cores, wherein the cache memory includes a first cache portion, the first cache portion including a direct-mapped cache, and a second cache portion, the second cache portion including a multi-way cache;

wherein the cache memory is an asymmetric set combined cache, the first cache portion being larger than the second cache portion; and wherein a coordinated replacement policy for the cache memory provides for replacement of data in the first cache portion and the second cache portion.

18. The system of claim 17, wherein each address of the main memory may be cached in a location in any of ways of the multi-way portion or a single location in the direct-mapped portion.

19. The system of claim 17, wherein the coordinated replacement policy includes application of a least recently used (LRU) algorithm.

20. The system of claim 19, wherein bits for the coordinated replacement policy are stored in the second cache portion for each way of the multi-way portion.

21. The system of claim 20, wherein the bits for the coordinated replacement policy for a first way of the multi-way portion include:

a first bit indicating a least recently used comparison of an entry of the first way with entries of each other way of multi-way portion; and a second bit indicating a least recently used comparison of the entry of the first way with an entry of a corresponding direct-mapped location.

22. A non-transitory computer-readable storage medium having stored thereon data representing sequences of instructions that, when executed by a processor, cause the processor to perform operations comprising:

receiving an access request for a memory address in a main memory;

determining whether there is a hit or miss in a cache memory for the memory address, wherein the cache memory includes:
  a first cache portion including a direct-mapped cache, and
  a second cache portion including a multi-way cache;

for a hit in either the first cache portion or the second cache portion, accessing requested data in the cache portion for which there is a hit; and for a miss in both the first cache portion and the second cache portion, replacing data for the memory address in either the first cache portion of the second cache portion according to a coordinated replacement policy for the cache memory.

23. The medium of claim 22, wherein an address of the main memory may be mapped to a location in any of ways of the multi-way cache of the second cache portion or to a single location in the direct-mapped cache of the first cache portion.

24. The medium of claim 22, wherein replacing data according to the coordinated replacement policy includes application of a least recently used (LRU) algorithm.

* * * * *